United States Patent [19]
Ohta et al.

[11] Patent Number: 5,843,626
[45] Date of Patent: Dec. 1, 1998

[54] METHOD FOR MANUFACTURING A MASTER DISC FOR OPTICAL DISCS

[75] Inventors: Minemasa Ohta; Hiroyuki Ohira; Nobuki Yamaoka; Yutaka Murakami, all of Yamanashi, Japan

[73] Assignees: Pioneer Video Corporation; Pioneer Electronic Corporation, both of Japan

[21] Appl. No.: 632,911

[22] Filed: Apr. 16, 1996

[30]    Foreign Application Priority Data

Apr. 19, 1995  [JP]  Japan ................................. 7-093836
Apr. 19, 1995  [JP]  Japan ................................. 7-093837

[51] Int. Cl.⁶ ........................................................ G11B 5/23
[52] U.S. Cl. .......................... 430/320; 430/945; 430/321; 204/169; 204/70; 204/167; 359/2
[58] Field of Search ................................. 264/1.31, 1.32, 264/1.33, 1.37, 1.38; 283/86; 359/2; 430/320, 321, 945; 204/167, 169, 70

[56]    References Cited

U.S. PATENT DOCUMENTS

| | | | |
|---|---|---|---|
| 4,108,660 | 8/1978 | Gale et al. | 430/321 |
| 4,244,633 | 1/1981 | Kellie | 430/1 |
| 4,677,285 | 6/1987 | Taniguchi | 430/1 |
| 4,734,345 | 3/1988 | Nomura et al. | 430/394 |
| 5,138,604 | 8/1992 | Umeda et al. | 283/86 |
| 5,142,383 | 8/1992 | Mallik | 283/86 |
| 5,346,654 | 9/1994 | Kodaka et al. | 264/1.33 |
| 5,452,282 | 9/1995 | Abraham | 430/1 |
| 5,498,509 | 3/1996 | Shin et al. | 430/321 |
| 5,607,188 | 3/1997 | Bahns et al. | 283/86 |
| 5,622,816 | 4/1997 | Maenza et al. | 430/945 |
| 5,671,205 | 9/1997 | Ledieu | 264/1.33 |

FOREIGN PATENT DOCUMENTS

2-30126  2/1990  Japan .
5-797    1/1993  Japan .

*Primary Examiner*—Martin Angebranndt
*Attorney, Agent, or Firm*—Perman & Green, LLP

[57]    ABSTRACT

In a method for manufacturing a master disc for optical discs, patterns to be displayed on the disc are classified into a main object and a background. The background is commonly assigned as the background pattern for glittering rainbow colors by diffracted light reflected from dummy pits of diffraction gratings or a hologram. The main object is individually assigned as the main object pattern of a diffused reflection portion or mirror surface. The manufacturing method comprises one group of steps for forming the common background pattern and the other group of steps for forming the individual main object pattern in the common background pattern. A development substrate for the master disc is formed by using a mask disc in a first light-exposure of a photoresist layer thereof and by using a displaying-pattern mask in a first light-exposure of the photoresist layer. The individual main object pattern is drawn in the common background pattern of the master disc by using a laser-marking or an etching. The mask disc and displaying-pattern mask can be used repeatedly as families for the background and main object patterns so as to facilitate the replication of the optical discs.

1 Claim, 5 Drawing Sheets

METHOD FOR MANUFACTURING A MASTER DISC FOR OPTICAL DISCS

BACKGROUND OF THE INVENTION

1. Field of the Invention

The present invention relates to a method for manufacturing a master disc for optical discs each to which a writing and/or read-out of data is performed by a light beam, and particularly to a reflection type optical disc consisting of two light-transmissible circular substrates adhered to each other.

2. Description of the Related Art

In a compact disc (CD) of a single substrate for example, the read-out of data is performed by irradiating a laser beam irradiation to only a one side thereof. In this single sided disc, the designation for contents recorded data on the disc such as title, artist and selections of tunes is printed or labeled on the protection layer of the back side as a visible printed pattern. Further, there is a double sided optical disc consisting of a pair of transparent circular substrates adhered to each other carrying the data regions for recorded data respectively such as Laser Disc (also referred to hereinafter as a "LD") and a digital video disc (also referred to hereinafter as a "DVD") and the like.

In case of such a double-sided optical disc comprising a pair of the adhered substrates, the designations for contents recorded data are printed on both labels of circular thin plates adhered around the center hole of the disc in the non-data region thereof.

Japanese Patent Publication No. 5-797 discloses a method for manufacturing an optical disc including a labeling or printing process as an outer step in which a visible displaying pattern is formed in a ring non-data region formed between a label region around the center hole of the disc and a data region around the peripheral thereof. However, the ring non-data region is a narrow area insufficient to bear a printed pattern. Particularly in case of DVD of a high density optical disc such a non-data region is a very narrow area that hardly bears a large pattern, so that the amounts of the designations for contents recorded data are suppressed.

Japanese Utility Model registration Kokai No. 2-30126 discloses a method for forming a hologram pattern on the non-data region of the disc in which the pattern to be displayed is previously formed on a stamper or mother disc as an internal step in its manufacturing process. However, the amounts of the designations for contents recorded data are also suppressed in the narrow ring non-data region of the optical disc.

In a known method for manufacturing a stamper for the mass production of optical discs, a predetermined pattern is formed on a photoresist layer by using a sequence or scanning exposure of light and an etching processes.

Such a manufacturing method of stamper for an optical disc includes the following procedures. In the laser-cutting step, while a flat circular glass substrate previously coated with a positive type photoresist layer is rotated, the photoresist layer is exposed to a micro-spot of a laser beam moving in the diameter of the substrate in which the laser beam is digitally modulated according to a predetermined signal, so that latent images of spot-row are spirally or concentrically formed on the photoresist layer. The photoresist layer of the glass substrate is then developed or etched so as to form minute pits aligned as a track i.e., a pit-row with a predetermined track pitch, the presence or absence of pits corresponding to the modulating digital signal carried by the layer. In the post-baking step,. the glass substrate with the photoresist layer is heated and then dried in order that the photoresist layer is rigidly post-cured on the glass. In this way, a master disc carrying the photoresist layer bearing the pit-row is obtained.

Subsequently, in the electroforming step, a metal electro-conductive layer is deposited on the photoresist layer bearing pits and the circular glass substrate of the master disc. Then, while the master disc is dipped into an electroforming bath, a metal layer is continuously and electrically plated on the electro-conductive layer by a predetermined large thickness so to form a body of stamper. Besides a pregroove may be formed onto the photoresist layer when the laser beam is continuously irradiated thereonto without any digital modulation in the laser-cutting step. In case that the irradiation of the laser beam with the digital modulation in light-intensity, the pit-row is formed. The pregroove and pit-row are also referred to herein as pits. Last, the stamper is separated from the glass substrate. The remaining photoresist layer and the electro-conductive layer are removed from the stamper. In this way, the stamper is produced.

By using the stamper in an injection molding device, replicas of discs each carrying a predetermined data recording surface are mass-produced. After a reflective layer and a protective layer are formed in turn on the data recording surface of the replica disc, an optical disc is completed.

In the method for manufacturing an optical disc as shown in Japanese Patent Publication No. 5-797, the recording of data formation on the photoresist layer and the formation of a displaying pattern are performed at the same time in the laser-cutting step. Thus the stamper is procured through the development and electroforming steps and so on. When the displaying pattern is formed in the laser-cutting step, there is a problem to cause a low yield rate of stampers. Moreover, since the area for displaying the visible pattern is small on a compact optical disc in diameter such as DVD, such a disc is insufficient to carry the pattern displaying region.

SUMMARY OF THE INVENTION

Thus, the present invention has been made to solve such a problem in view of the forgoing status. An object of the invention is to provide a method for manufacturing a master disc for optical discs each having a large clear displaying pattern such as characters or logos so as to cause a high yield rate of the final disc productions.

In a first aspect of the present invention of method for manufacturing a master disc for optical discs. Each optical disc comprises signal portions concentrically or spirally formed as a pit-row of recorded track on one side and a displaying pattern region having a diffraction grating region generating diffracted lights due to an incident light and a non-diffraction region on the other side, and the optical disc is capable of having a signal pit-row on the both sides. The method manufacturing comprises the steps of:

preparing a development substrate coated with a photoresist layer;

preparing a mask disc having a light-permeable substrate and a thin opaque film formed on the light-permeable substrate having openings for passing light;

after said mask disc is arranged on said photoresist layer of said development substrate, performing a light-exposure of said photoresist layer through said openings of said thin opaque film as a first light-exposure step for a diffraction grating region;

preparing a displaying-pattern mask having a light-permeable portion;

after said displaying-pattern mask is arranged on said photoresist layer of said development substrate, performing a light-exposure of said photoresist layer through said light-permeable portion of said displaying-pattern mask as a second light-exposure step for a non-diffraction region; and performing a development of said development substrate whose said photoresist layer light-exposed in said first and the second light-exposure steps.

In an embodiment of the invention, said first light-exposure step and said second light-exposure step are inversely performed.

In another embodiment of the invention, said mask disc and said displaying-pattern mask overlapped on said photoresist layer and then, said first light-exposure step and said second light-exposure step are performed at the same time.

Moreover, in further another embodiment of the invention, said openings of said mask disc are formed correspondingly to the diffraction grating region which comprises a dummy pit-row or a pregroove formed spirally or concentrically formed at a predetermined pitch, or in straight lines parallel to each other with a predetermined pitch. Alternatively the diffraction grating region may be comprise a hologram.

In a second aspect of a method for manufacturing a master disc for optical discs each optical disc comprising signal portions concentrically or spirally formed as a pit-row of recorded track on one side and a displaying pattern region having a diffraction grating region generating diffracted lights due to an incident light and a non-diffraction region on the other side, and capable of having a signal pit-row on the both sides in accordance with the present invention, the manufacturing method comprises the steps of:

preparing a preliminary master disc having a diffraction grating region; and forming a non-diffraction region in said diffraction grating region of said preliminary master disc in such a manner that a portion correspondingly to a only pattern to be displayed is removed from said diffraction grating region.

In an embodiment of the invention, said forming step of the non-diffraction region is performed by a laser-marking.

In another embodiment of the invention, said forming step of the non-diffraction region is performed by an etching.

According to the present invention of a method for manufacturing a master disc for optical discs, patterns to be displayed on the disc are classified into a main object and a background and then the background is commonly assigned as the background pattern for glittering rainbow colors by diffracted light reflected from dummy pits of diffraction gratings or a hologram. Subsequently the main object is individually assigned as the main object pattern of a diffused reflection portion or mirror surface. The optical disc manufacturing method comprises one group of steps for forming the common background pattern and the other group of steps for forming the individual main object pattern in the common background pattern. Therefore, the mask disc can be repeatedly used without any necessity of laser-cutting steps for forming various patterns every time as differing from in the art. Further, the mask disc with the background displaying pattern can be used repeatedly as a family of background mask discs so as to facilitate the replication of the optical discs through an electroforming method. In addition, not only the main object patterns to be displayed but also the background a displaying pattern may be stocked as families respectively. Furthermore, it is possible to combine them in variety to allow a rich displaying of the patterns in the invention. In addition, particularly, a large pattern displaying is achieved in even a compact high density optical disc such as a DVD.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENTS

The embodiments according to the present invention will be described in more detail with reference to the accompanying drawings.

(Reflection type double-sided optical disc)

Figure 1:
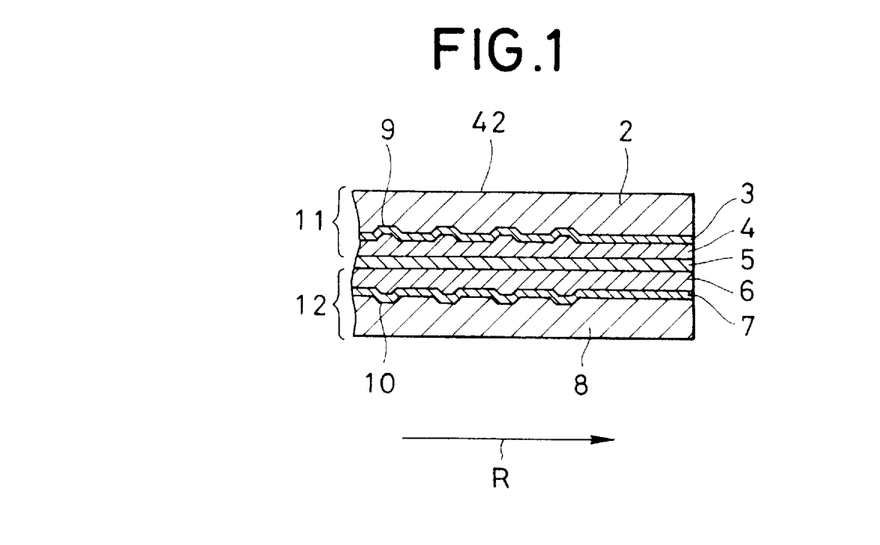
FIG. 1 is a partial cross section view of an optical disc of an embodiment according to the present invention.

FIG. 1 shows a structure of an optical disc 42 of the embodiment which is a so-called double-sided optical disc in which an information recording disc portion 12 and a dummy disc portion 11 are coupled by an adhesive layer 5.

The information recording disc portion 12 is constructed by a circular substrate 8, a reflective layer 7 and a protective layer 6. A plurality of signal pits 10 are concentrically or spirally formed as a pit-row of recorded track on one side of the substrate 8. The reflective layer 7 of a metal is formed on the signal pits-bearing surface of the substrate 8 and is covered with the protective layer 6. The dummy disc portion 11 is also constructed by a circular substrate 2, a reflective layer 3 and a protective layer 4. A plurality of pits or dummy pits 9 are concentrically or spirally formed as a group of pits on one side of the substrate 2. The reflective layer 3 of a metal is formed on the dummy pits-bearing surface of the substrate 4. Such dummy pits 9 are formed so as to generate a bright glitter of rainbow colors due to the diffracted light reflected therefrom.

The circular substrates 2 and 8 of the same size are made of a transparent plastic and then the dummy disc portion 11 and the information recording disc portion 12 are adhered by the adhesive layer 5 between the protective layers 4 and 6 so as to be the double-sided optical disc 42. In both the disc portion, the signal pits corresponding to data to be reproduced and the dummy pits are previously injection-molded in the plastic substrates respectively.

Besides, the formation of the substrates carrying pre-pits is not restricted by the injection molding process. The respective substrates may be formed through the so-called 2P (photo-polymerization) process in which the circular recess is formed on a transfer layer of a liquid UV-cured resin on a transparent substrate together with pregrooves and the like, instead of the injection-molded plastic substrate. The material for the transparent substrate in the present invention is selected from acrylate resin such as polymethyl methacrylate (PMMA) and the like, polymers such as polycarbonate (PC), polyvinyl chloride, polyimides, polyamides, cellulose acetates, polyethylene terephthalate and the like, and further glass, ceramics and the like.

The material for the reflective layer in the present invention is selected from a high reflectance metal or an alloy thereof such as gold (Au), copper (Cu), Aluminum (Al) and the like. The reflective layer is formed by the vacuum-deposition, the sputtering or the ion-plating.

The protection layer in the present invention is preferably formed by the spin-coating method using a UV-cured resin and then the UV-irradiation is performed thereon for hardening the coating. The material for the protection layer is selected from epoxy resins, acrylic resins, silicone resins, urethane resins and the like. The protection layer may be omitted if the reflective layer has a durability.

The material for the adhesive layer in the present invention is selected from hot-melt adhesives, UV-cured resins, rubber adhesives, urethane adhesives, epoxy adhesives and the like. the adhesive is provided by the roll-coating, the spin-coating, the screen-printing or the like.

The embodiment above mentioned is a reflection ROM type optical disc carrying pre-pits i.e., signal pits in the data region of the reflective layer of the information recording disc portion 12. In addition, a write-once type optical disc may be employed in the present invention which comprises a recordable data region consisting of a photo-absorbing layer made of an organic cyanine dye and a metal layer formed thereon. Moreover, a phase-change type optical disc may be also employed in the present invention which comprises a recordable data region consisting of a phase-change metal alloy whose phase changes between crystal and amorphous in response to a light irradiation thereon. Furthermore, a magneto-optical disc type optical disc may be also employed in the present invention which comprises a recordable data region consisting of a rare earth-transition metal amorphous alloy and a dielectric layer. In these cases each data region is formed by the vacuum-deposition, the sputtering or the ion-plating.

Figure 2:
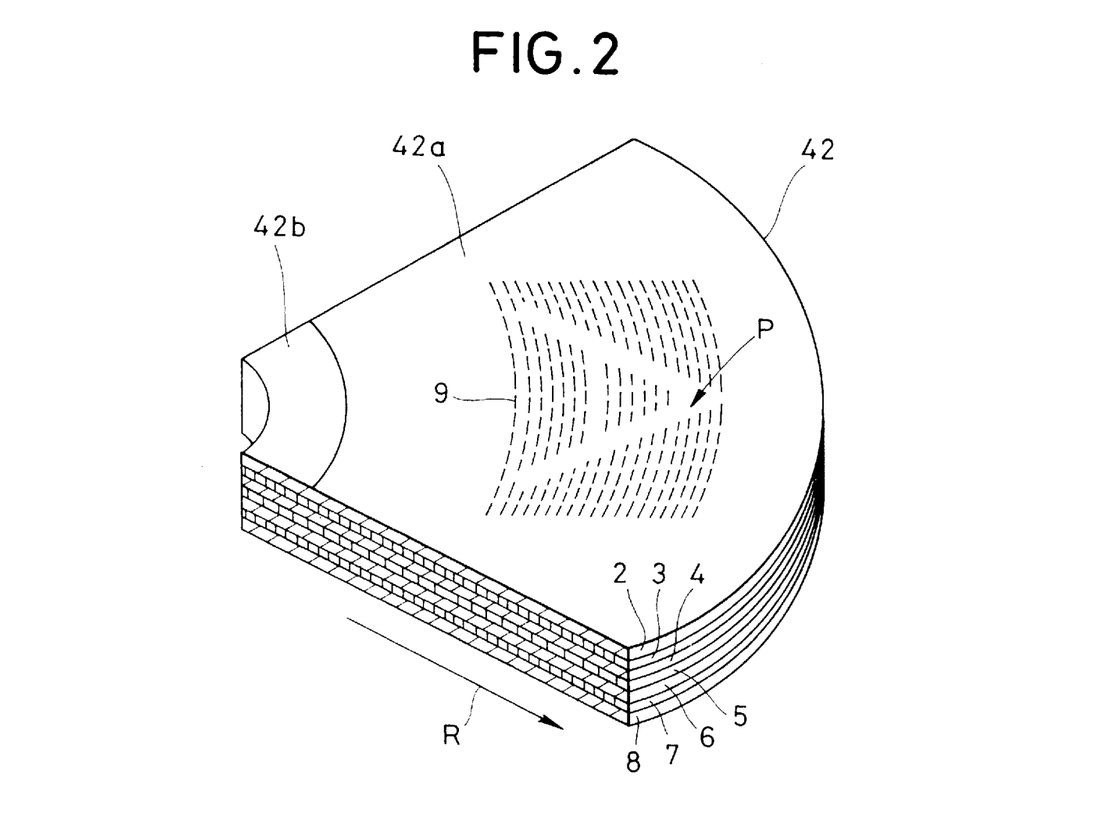
FIG. 2 is a perspective view of an optical disc of an embodiment according to the present invention.

As seen from FIG. 2 of a perspective view of the optical disc partially cut in the invention, the dummy disc portion 11 of the optical disc 42 is sectioned into a pits bearing region 42a and a non-data region or label region 42b. In the pits bearing region 42a of the dummy disc portion 11, a pattern-displaying region P representing a character logo "A" is defined by the group of the dummy pits. The group of the dummy pits is formed around the character logo pattern "A", but not in the pattern. Namely, the pattern-displaying region P is set to a blank area to make a mirror surface of the character logo "A". Obviously, the dummy pits are formed not only around the character logo pattern "A" but also a whole portion out of the pattern in the dummy disc portion 11. Arrow R represents the radius direction of the disc in the figure.

In the pit-bearing surface of the dummy disc portion 11 of the optical disc 42, although lights reflected from the group of dummy pits 9 include the diffraction light components, lights reflected from the mirror portion without any pit do not include any diffraction light component. Therefore, the displaying pattern P can be visibly recognized due to the existence and absence of the diffracted light reflected from the group of dummy pits.

In the above embodiment, the dummy pits are formed in the portions out of the pattern-displaying region P. However, the dummy pits may be formed only within the portion of the pattern-displaying region P.

If dummy pits are formed inside and outside of the pattern-displaying region P, the inside and outside pits can be different from each other in depth or density. In this case, since the intensities or the diffraction angles of the reflected diffraction lights differ from each other inside and outside of the pattern-displaying region P, the display pattern can be visibly recognized.

Although the character "A" as the pattern to be displayed is employed by using the group of dummy pits in the above embodiment, the display pattern is not limited by this character. It is possible to display patterns such as graphics and pictures representing the contents of information signal recorded on the optical disc.

In another embodiment, the dummy pits may be formed and arranged in straight lines parallel to each other with a predetermined pitch, instead of the dummy pit-row concentrically or spirally formed with a predetermined pitch in the above mentioned embodiment. Moreover, the dummy pits may be formed and arranged as a diffraction grating such as a wave pattern of mosaic. Furthermore, instead of the dummy pits, a phase hologram such as a rainbow hologram may be employed to the inside or outside of the pattern-displaying region P in which an intensity distribution of interference pattern between a predetermined light to be recorded and a reference light is formed as minute bumps and dents on the reflective layer.

The disc information concerning the disc contents to be carried by the pattern-displaying region P includes the designations or formats for LD, CD, DVD, MO and the like representing the classification of the optical disc, the music information, the graphic information, the patent information, the data compression format information and the like, and further the classification information of data recorded in the data region, its index information, its title or contents information and the like. In addition, the pattern-displaying region P may be bear visible optical patterns such as printed characters, symbols, logos, graphics representing a title, A and B -sided designations and the like, and further other optical patterns such as bar-codes and the like to be optically read out. There is formed an optical disc according to the invention as an example, that is, a DVD double sided optical disc which has specifications e.g., the diameter of 12 cm; the thickness of each substrate of 0.6 mm; the thickness of the reflective layer of 500 to 1500 angstroms; the thickness of the protection layer 5 to 20 micrometers; and the thickness of the adhesive layer on tens micrometers.

1. (Method for manufacturing a master disc for optical discs)

An embodiment of an optical disc manufacturing method according to the invention will now be described hereinafter. This optical disc manufacturing method is outlined in which patterns to be displayed are classified into a main object and a background and then the background is designated as the background pattern for glittering rainbow colors by diffracted light reflected from dummy pits of diffraction gratings and then the main object is designated as the main object pattern of a mirror surface. The optical disc manufacturing method comprises a group of steps for making the dummy pits of diffraction gratings in a batch manner of the light-exposure and, after that, a separate group of steps for making the mirror surface in a batch manner of the light-exposure.

1.1 (Formation of a mask disc for the diffraction grating region)

FIGS. 3A to 3F show the group of steps for making the mask disc carrying the dummy pits of diffraction grating region in a batch manner of the light-exposure which is included in the first embodiment of the invention.

Figure 3A:
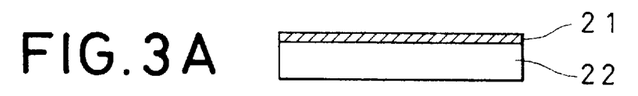
FIGS. 3A to 3F are cross section views of substrates in a method of a first embodiment for manufacturing a master disc for optical discs according to the present invention.

First, as shown in FIG. 3A, an opaque thin metal film 21 made of chromium (Cr) or the like is formed on a circular glass substrate 22 through the sputtering or vacuum-deposition.

Figure 3B:
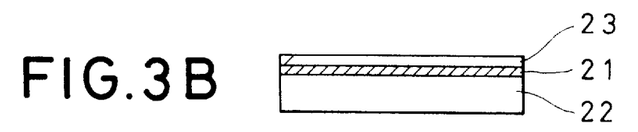

Next, as shown in FIG. 3B, a positive type photoresist layer 23 is formed on the metal film 21 through the spin-coating method.

Figure 3C:
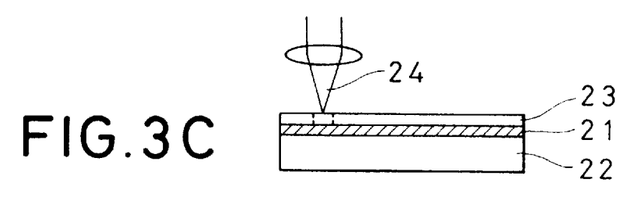

Next, as shown in FIG. 3C, while the substrate 22 is rotated, an irradiation spot of a recording laser beam 24 digitally modulated in light-intensity in accordance with a dummy signal is moved at a constant speed in a diameter direction of the substrate, so that the photoresist layer 23 of the substrate is light-exposed on which latent images of dummy pit-row (or a pregroove) is formed at a predetermined constant pitch.

Figure 3D:
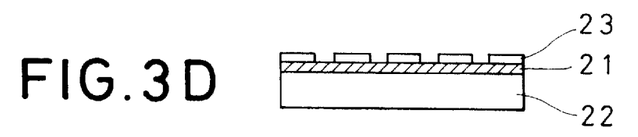

Next, as shown in FIG. 3D, the photoresist layer 23 carrying dummy pit-row latent images is developed and then the substrate 22 is dried and post-baked to form a dummy pit-row on the substrate 22.

Figure 3E:
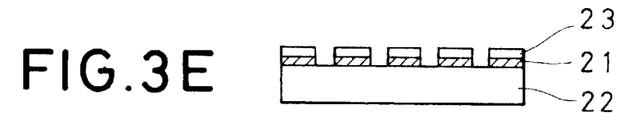

Next, as shown in FIG. 3E, the opaque metal film 21 is etched through a plurality of penetrated holes of the dummy pit-row in the photoresist layer 23, openings spirally or concentrically arranged is formed on the opaque thin metal film 21 at a predetermined pitch.

Figure 3F:
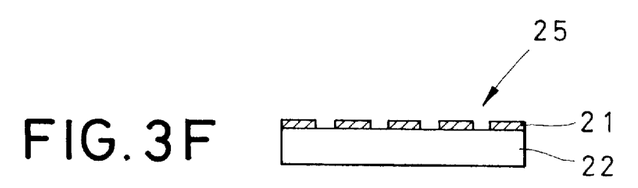

Next, as shown in FIG. 3F, the photoresist layer is removed, so that a mask disc 25 is provided with the opaque metal film having openings spirally or concentrically arranged for making a diffraction grating region in a later step.

This mask disc 25 is capable of using repeatedly in the later step. Since a plurality of mask discs may be formed correspondingly to various background patterns to be displayed, the mask discs may be stocked as a family of background mask discs. If only this dummy signal mask disc 25 is used in the later step, a dummy disc entirely having a glitter surface of rainbow colors as the background will be formed.

1.2 (Formation of a displaying-pattern mask)

A displaying-pattern mask is formed in order to form a displaying pattern region of the main object in the diffraction grating region. The main object includes various patterns such as character logos, symbols, pictures and the like. The displaying-pattern mask is provided with a light-permeable portion corresponding to the main objects. For example, the displaying-pattern mask is a monochromatic photograph film developed and having a predetermined object image photographed e.g., a negative or positive film constructed by a distribution of a gradation, a light-shading and a light-permeable portion. This displaying-pattern mask is capable of using repeatedly in the later step. Since a plurality of displaying-pattern masks may be formed correspondingly to various main object patterns to be displayed, the displaying-pattern masks may be stocked as a family of object mask.

1.3 (Formation of a development substrate)

A positive type the photoresist layer is uniformly formed on one surface of a circular glass substrate through the spin-coating method, so that the development substrate is formed.

1.4 (Light-exposure development step)

Figure 4A:
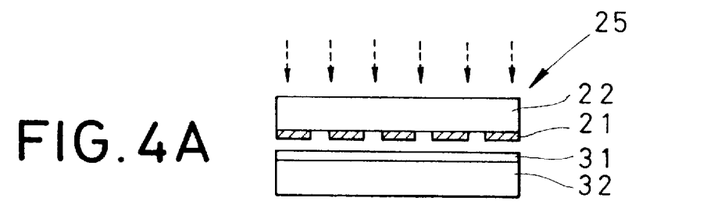
FIGS. 4A to 4C are cross section views of substrates in a method of the first embodiment for manufacturing a master disc for optical discs according to the present invention.
Figure 4B:
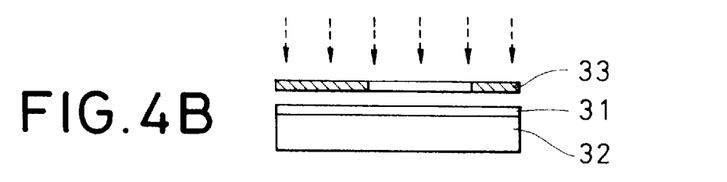
Figure 4C:
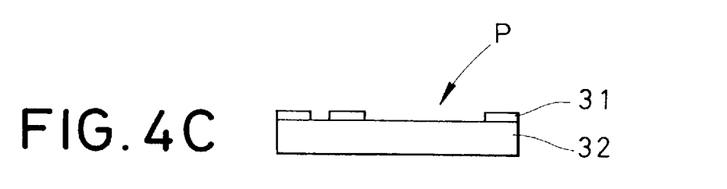

FIGS. 4A to 4C show a light-exposure development step in the first embodiment of the invention.

First, as shown in FIG. 4A, a photoresist layer 31 is formed on a flat circular glass substrate 32 as a development substrate. The mask disc 25 is arranged and sealingly abutted on the photoresist layer 31 although a gap appearing in the figure briefly. After that, light is exposed through the mask disc 25 to the photoresist layer 31, so that latent images of the background displaying pattern are formed as a first light-exposure step. In this case, the mask disc 25 is disposed on the photoresist layer 31 in such a manner that the opaque metal film 21 of the glass substrate 22 facing to the photoresist layer in the batch light-exposure step.

Next, as shown in FIG. 4B, a negative film 33 carrying one of the various main object patterns such as character logos, symbols, pictures and the like is arranged and sealingly abutted on the photoresist layer 31 previously carrying the background latent images, although a gap appearing in the figure briefly. After that, light is exposed through the negative film 33 to the photoresist layer 31, so that latent images of the main object displaying pattern are formed as a second light-exposure step.

In addition, the first and the second light-exposure steps shown in FIGS. 4A and 4B may be reversed.

Next, as shown in FIG. 4C, the exposed photoresist layer 31 is developed, so that a master disc is obtained which has an overlapped pattern comprising a main object pattern P or a mirror surface without any dummy pit-row and the background of dummy pit-row surrounding the main object pattern.

Moreover, instead of the two-step light-exposures, only one light-exposure step may be performed in such a manner that the negative film 33 is sealingly inserted between the photoresist layer 31 of the circular glass substrate 32 and the opaque metal film 21 of the mask disc 25. In this case, another master disc is obtained which has an overlapped pattern comprising a main object pattern P with the dummy pit-row and the background of a mirror surface surrounding the main object pattern.

1.5 (Electroforming step)

Subsequently, a metal electro-conductive layer is entirely formed on the exposed photoresist layer 31 with the dummy pit-row in an electroforming step. Then the circular glass substrate 32 coated with the conductive layer is dipped into an electroforming bath to growing the conductive metal film as a stamper body. After forming the stamper body, it is separated from the glass substrate,. In this way, a stamper i.e., a master disc for optical discs is completed.

According to the invention, the mask disc can be repeatedly used without necessity of laser-cutting steps for forming various patterns every time as in the art. Further, not only the main object patterns to be displayed (negative films) but also the background a displaying pattern (mask discs) may be stocked as families respectively. Furthermore, it is possible to combine them in variety to allow a rich displaying of the patterns in the invention. In addition, the invention facilitates the reproduction of the stamper.

1.6 (Assembling for a double-sided optical disc)

Replicas of plastic resin substrates are formed through the injection molding process by using the resultant stamper. A reflective layer and a protective layer are formed in turn on the dummy pits-bearing surface of the replica so that a dummy disc portion is obtained. This is adhered via an adhesive layer to an information recording disc portion formed through another process, so that the double-sided optical disc as shown FIG. 1 is completed.

In the resultant double-sided optical disc, the background as a whole glitters with rainbow colors due to the dummy pits region and the main object patterns is deeply displayed as a mirror surface. That is a so-called pits art. In addition, the final double-sided optical discs with the pits arts are manufactured at a high yield rate of production.

2. (Second embodiment for manufacturing a master disc for optical discs using another mask disc formation)

Figure 5A:
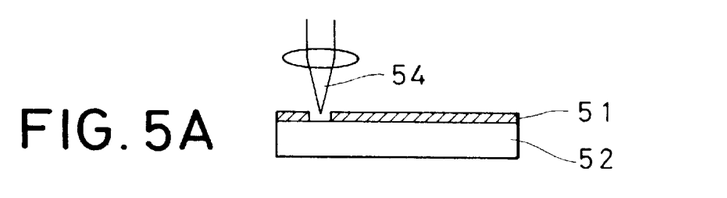
FIGS. 5A and 5B are cross section views of substrates in a method of the first embodiment for manufacturing a master disc for optical discs according to the present invention.
Figure 5B:
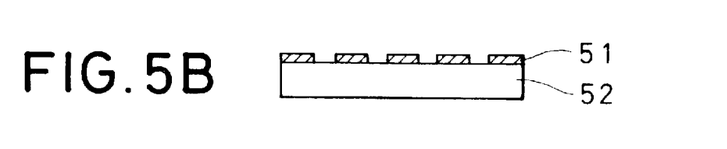

FIG. 5 shows the mask disc formation in the second embodiment. Although the first embodiment includes the steps of lithography using the photoresist layer for the background mask disc as shown in FIGS. 3A to 3F, the second embodiment excludes such a lithography for the background mask disc to simplify the process. First, as shown in FIG. 5A, an opaque thin metal film 51 made of chromium or the like is formed on the circular glass substrate 52 through the sputtering or vacuum-deposition instead of the photoresist layer.

Next, as shown in FIG. 5B, while the substrate 52 is rotated, an irradiation spot of a recording laser beam 54 digitally modulated in light-intensity in accordance with a dummy signal is moved at a constant speed in a diameter direction of the substrate, so that the opaque thin metal film 51 is selectively and partially melted and vaporized or sublimated so that the dummy pit-row (or a pregroove) is directly formed at a predetermined constant pitch.

In this way, a mask disc comprises the opaque thin metal film with pit-row openings in such a manner that steps for the background mask disc are reduced in the second embodiment.

A phase holograph may be used for the mask disc. The mask disc of the phase holograph is formed in a way that the photoresist layer is light-exposed by using a mask of an amplitude hologram in which the interference fringe is previously recorded, instead of the light-exposure development step as shown in FIGS. 3A to 3F. A master disc with the background holograph for optical discs is obtained by using the mask disc of the phase holograph in the light-exposure development step as shown in FIGS. 4A to 4C.

According to the present invention of a method for manufacturing a master disc for optical discs, patterns to be displayed are classified into a main object and a background and then the background is commonly designated as the background pattern for glittering rainbow colors by diffracted light reflected from dummy pits of diffraction gratings or a hologram and then the main object is individually designated as the main object pattern of a mirror surface. The optical disc manufacturing method comprises one group of steps for forming the common background pattern and the other group of steps for forming the individual main object pattern. Therefore, mask disc with the background displaying pattern can be used repeatedly as a family of background mask discs so as to facilitate the replication of the optical discs. In addition, the mask disc can be repeatedly used without any necessity of laser-cutting steps for forming various patterns every time as differing from in the art. Further, not only the main object patterns to be displayed but also the background a displaying pattern may be stocked as families respectively. Furthermore, it is possible to combine them in variety to allow a rich displaying of the patterns in the invention. In addition, particularly, a large pattern displaying is achieved in even a compact high density optical disc such as a DVD.

3. (Third and fourth embodiments for manufacturing master discs for optical discs)

Figure 6A:
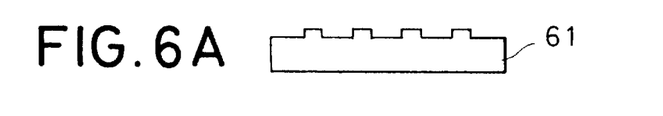
FIGS. 6A to 6C are cross section views of substrates in a method of a second embodiment for manufacturing a master disc for optical discs according to the present invention.
Figure 6B:
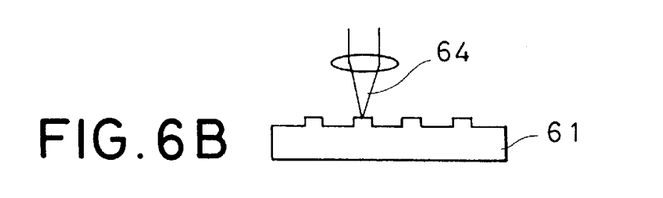
Figure 6C:
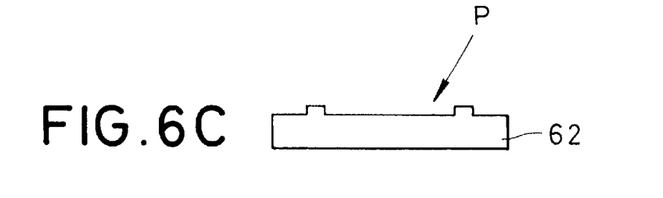

Other embodiments of optical disc manufacturing methods according to the invention will now be described hereinafter. These optical disc manufacturing methods are outlined in which patterns to be displayed are also classified into a main object and a background and then the background is designated as the background pattern for glittering rainbow colors by diffracted light reflected from dummy pits of diffraction gratings or a hologram (diffraction grating region) and then the main object is designated as the main object pattern of a diffused reflection portion or a mirror surface. The optical disc manufacturing method comprises a group of steps for making a preliminary master disc having the background pattern of diffraction gratings and a separate group of steps for making the main object pattern in the background pattern. FIGS. 6A to 6C show the third embodiment and FIGS. 7A to 7D show the fourth embodiment.

3.1 (Formation of a preliminary master disc for optical discs)

First, while a substrate carrying a positive type photoresist layer is rotated, an irradiation spot of a recording laser beam digitally modulated in light-intensity in accordance with a dummy signal is moved at a constant speed in a diameter direction of the substrate, so that the photoresist layer is light-exposed as latent images. After development, drying and post-baking steps, spiral or concentric dummy pit-row is formed on the glass substrate at a predetermined constant pitch. Subsequently, a metal electro-conductive layer is deposited on the photoresist layer bearing pits and then, in an electroforming bath, a metal layer is continuously and electrically plated so to form a body of stamper. After separating the stamper and the glass substrate, a master stamper carrying the background pit-row (diffraction grating region) glittering rainbow colors is obtained. The master stampers may be formed through the electroforming step as a preliminary stamper 61 (see FIG. 6A).

3.2 (Removing dummy pits by a laser-marking method)

Next, as shown in FIG. 6B, while the preliminary stamper 61 is rotated, an irradiation spot of a laser beam 64 scanning or continuing the main object of various patterns such as character logos, symbols, pictures and the like is secretively irradiated onto the diffraction grating region of the substrate so as to crush and melt the pits and make a shallow recess, so that the main object patterns P to be displayed is directly drawn in the background consisted of the dummy pit-rows master disc 62 for the optical discs as shown in FIG. 6C. The main object pattern to be displayed is a diffused reflection portion without any diffracted light reflected therefrom.

In the third embodiment, the background of dummy pit-row surrounding the main object patterns to be displayed without dummy pit-row is formed in common master discs for optical discs to enable provide a master disc for optical discs with the main object patterns to be displayed in variety even by a few number of background stampers through a reduced steps in its manufacturing.

3.2 (Removing dummy pits by an etching method)

Figure 7A:
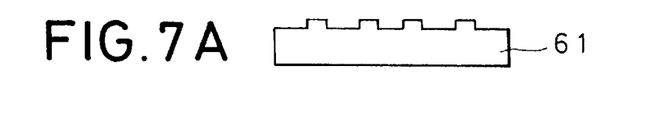
FIGS. 7A to 7D are cross section views of preliminary stampers in a method of the second embodiment for manufacturing a master disc for optical discs according to the present invention.

Moreover, the etching method may be used in the fourth embodiment of manufacturing process for a master disc for optical discs. A preliminary master disc for optical discs 61 i.e., preliminary stamper is formed in the same way of the third embodiment so as to have the background of glitter of rainbow colors as shown in FIG. 7A.

Figure 7B:
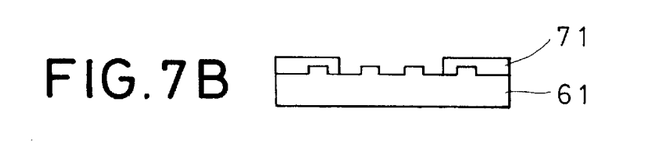

Next, as shown in FIG. 7B, a main object pattern mask 71 made of a liquid paste UV-cured resin having openings the main object such as character logos, symbols, pictures or the like is formed by a screen printing method on the background dummy pit-row of the preliminary stamper 61 and then cured by irradiation of UV rays to solidify the UV-cured resin.

Figure 7C:
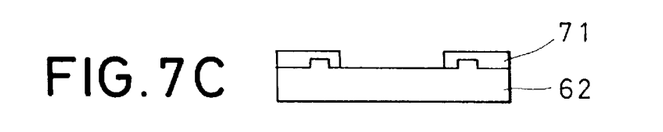

Next, as shown in FIG. 7C, dummy pits and its adjacent portions are melted through the opening of the main object pattern mask 71 by a predetermined etchant to make a shallow flat recess in dummy pit's places. In this way, the main object patterns to be displayed is formed as a mirror surface portions. This etching method enable to make the stamper 62 with the main object patterns to be displayed.

Figure 7D:
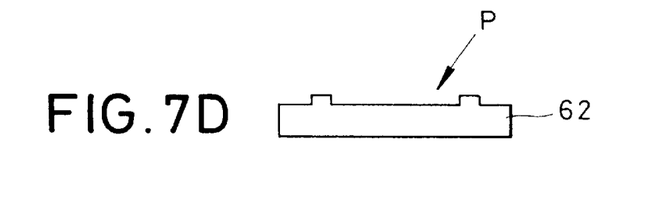

Next, as shown in FIG. 7D, the main object pattern mask 71 is removed by a predetermined pertinent solvent from the stamper 62 so that a master disc 62 for optical discs is obtained.

In the fourth embodiment, the background of dummy pit-row surrounding the main object patterns to be displayed without dummy pit-row is also formed in common master discs for optical discs to enable provide a master stamper for optical discs with the main object patterns to be displayed in variety even by a few number of background stampers through a reduced steps in its manufacturing.

4. (Fifth embodiment for manufacturing a master disc for optical discs having another diffraction grating region)

Instead of the above mentioned embodiments each having pits arts consisting of the background of glitter of rainbow colors i.e., dummy pits region and the mirror surface region of the main object patterns to be displayed in the resultant double-sided optical disc, hologram may be formed in the dummy pit's places in the fifth embodiment.

Figure 8A:
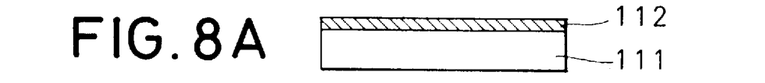
FIGS. 8A to 8G are cross section views of substrates in a method of the second embodiment for manufacturing a master disc for optical discs according to the present invention.

First, as shown in FIG. 8A, a circular glass substrate 111 coated with a positive type or negative type photoresist layer 112 is prepared.

Figure 8B:
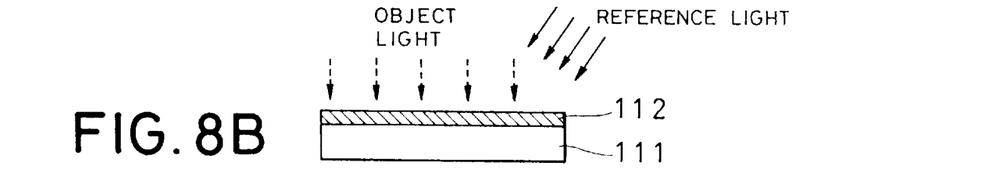

Next, as shown in FIG. 8B, a predetermined light generated from an object to be recorded as a background pattern and a reference light is irradiated by using a holography device into the photoresist layer 112 at the same time, so that a latent image of the predetermined background pattern is formed on the photoresist layer 112 as an intensity distribution of interference pattern between the predetermined light and the reference light.

Figure 8C:
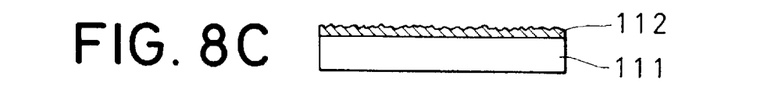

Next, as shown in FIG. 8C, the light-exposed photoresist layer is developed, dried and post-baked so as to form minute bumps and dents corresponding to the interference pattern on the photoresist layer 112 as a master disc.

Figure 8D:
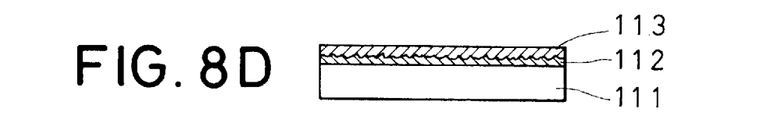

Next, as shown in FIG. 8D, a metal electro-conductive layer 113 is deposited on the photoresist layer bearing the minute bumps and dents.

Figure 8E:
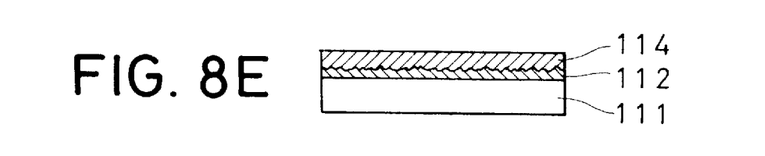

Next, as shown in FIG. 8E, while the master disc is dipped into an electroforming bath, a metal layer 113 is continuously and electrically plated on the electro-conductive layer by a predetermined large thickness so to form a body of preliminary stamper 114.

Figure 8F:
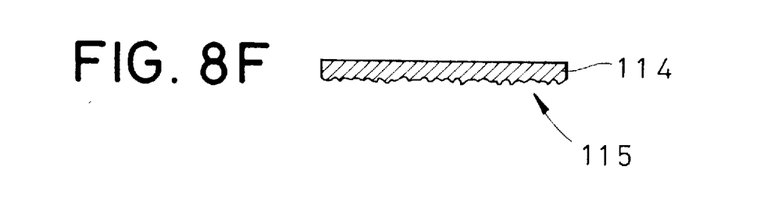

Next, as shown in FIG. 8F, preliminary stamper 114 is separated from the circular glass substrate. The remaining photoresist layer and the electro-conductive layer are removed from the stamper. In this way, a preliminary stamper with a hologram surface 115 is produced for the background pattern.

Figure 8G:
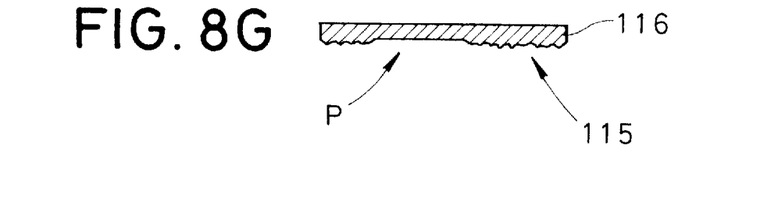

After that, a predetermined area of the hologram surface 115 of the preliminary stamper 114 is selectively crushed and melted so as to make a diffused reflection surface or a shallow flat recess corresponding to the main object such as character logos, symbols, pictures or the like in the same way of the third embodiment of FIG. 6 with the laser-marking or the fourth embodiment of FIG. 7 with the etching. The main object pattern to be displayed is made as a diffused reflection portion or mirror surface without any diffracted light reflected therefrom as shown in FIG. 8G. In this way, a master disc for optical discs 116 including the pits art with the main object pattern P in the background hologram 115 is obtained.

According to the present invention of a method for manufacturing a master disc for optical discs, patterns to be displayed are classified into a main object and a background and then the background is commonly designated as the background pattern for glittering rainbow colors by diffracted light reflected from diffraction gratings or a hologram and then the main object is individually designated as the main object pattern of a diffused reflection portion or mirror surface. The optical disc manufacturing method comprises one group of steps for forming the common background pattern and the other group of steps for forming the individual main object pattern by the laser-marking or etching step. Therefore, mask disc with the background displaying pattern can be used repeatedly as a family of background mask discs so as to facilitate the replication of the optical discs. In addition, the mask disc can be repeatedly used without any necessity of laser-cutting steps for forming various patterns every time as differing from in the art. Further, not only the main object patterns to be displayed but also the background a displaying pattern may be stocked as families respectively. Furthermore, it is possible to combine them in variety to allow a rich displaying of the patterns in the invention. In addition, particularly, a large pattern displaying is achieved in even a compact high density optical disc such as a DVD.

It should thus be apparent that the scope of the teaching of this invention is not intended to be limited by only the embodiments that have been expressly disclosed and illustrated, but that instead the scope of the teaching of this invention should be read as being commensurate with the scope of the claims that follow.

What is claimed is:

1. A method for making a master disc used for manufacturing a double-sided optical disc of reflection type each comprising a pair of light-transmissive circular substrates adhered to each other, one light-transmissive circular substrate being an information recording disc having signal portions concentrically or spirally formed as a pit-row of recorded track and, the other light-transmissive circular substrate being a dummy disc having a displaying pattern region having a diffraction grating region generating diffracted lights due to an incident light and a non-diffraction region, the master disc is a master stamper for replication of the dummy disc, the method comprising the steps of:

making a circular substrate on which a photoresist layer bearing an image of a spiral or concentric dummy pit-row or pregroove at a predetermined constant pitch;

depositing a metal electro-conductive layer on the imaged photoresist layer;

plating continuously and electrically a metal layer on the metal electro-conductive layer in an electroforming bath so as to form a preliminary stamper of the metal;

separating the preliminary stamper and the substrate thereby preparing the preliminary carrying the dummy pit-row or pregroove forming the diffraction grating region; and forming the non-diffraction region in said diffraction grating region of said preliminary stamper in such a manner that a portion of the dummy pit-row or pregroove corresponding to a main object pattern to be displayed is selectively removed from said diffraction grating region, wherein said forming step of the non-diffraction region is performed by a laser-marking so that the portion of the dummy pit-row or pregroove is crushed and melted, thereby preparing a master stamper.

* * * * *